(12) United States Patent
Simonis et al.

(10) Patent No.: US 9,279,452 B2
(45) Date of Patent: Mar. 8, 2016

(54) BEARING ASSEMBLY OF A STEERING COLUMN LEVER ON A STEERING COLUMN PART, AND MOTOR VEHICLE WITH SUCH A BEARING ASSEMBLY

(75) Inventors: Karl Simonis, Illingen (DE); Roland Gruener, Tamm (DE); Laurent Raddaz, Bietigheim-Bissingen (DE); Martin Hasch, Schwieberdingen (DE); Enrico Raimondo, Bietigheim-Bissingen (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 245 days.

(21) Appl. No.: 14/001,883

(22) PCT Filed: Feb. 20, 2012

(86) PCT No.: PCT/EP2012/052832
§ 371 (c)(1),
(2), (4) Date: Jan. 14, 2014

(87) PCT Pub. No.: WO2012/123225
PCT Pub. Date: Sep. 20, 2012

(65) Prior Publication Data
US 2014/0133790 A1    May 15, 2014

(30) Foreign Application Priority Data
Mar. 17, 2011 (DE) .......................... 10 2011 014 252

(51) Int. Cl.
*H01H 9/00* (2006.01)
*F16C 33/04* (2006.01)
(Continued)

(52) U.S. Cl.
CPC .............. *F16C 33/04* (2013.01); *B60Q 1/1469* (2013.01); *F16C 17/26* (2013.01); *F16C 27/02* (2013.01); *F16C 11/04* (2013.01)

(58) Field of Classification Search
CPC ........ B60Q 1/1469; F16C 27/02; F16C 33/04; F16C 17/26; F16C 11/04
USPC ............................................ 200/61.54, 61.27
See application file for complete search history.

(56) References Cited

U.S. PATENT DOCUMENTS

| 2004/0144630 A1* | 7/2004 | Heinze et al. ............... 200/61.27 |
| 2005/0269192 A1* | 12/2005 | Mochizuki ................. 200/61.54 |

(Continued)

FOREIGN PATENT DOCUMENTS

| DE | 195 40 803 A1 | 5/1997 |
| DE | 102 56 785 A1 | 6/2004 |

(Continued)

OTHER PUBLICATIONS

Hirschfeld Klaus, Steering column switch for motor vehicle has operating lever held on two pivot pins with spherical end portions and inner projection with compression spring engaging bolt, Mar. 9, 2006, German Patent Office, DE 10 2004 042 653 A1, English Abstract.*

(Continued)

*Primary Examiner* — James English
(74) *Attorney, Agent, or Firm* — Osha Liang LLP

(57) ABSTRACT

The invention concerns a bearing assembly (2) of a steering column lever on a steering column part (1) of a motor vehicle, wherein the steering column lever is mounted on the steering column part (1) pivotably at least indirectly via a bearing (5, 9) having a main bearing point (26, 28) which is formed by a main bearing journal (4, 10) and a corresponding main bearing sleeve (20, 21). The bearing (5, 9) has an additional bearing journal (7, 11) which is arranged concentrically in relation to the main bearing journal (4, 10) and in particular has a smaller diameter than the main bearing journal (4, 10), wherein the additional bearing journal (7, 11) and a corresponding additional bearing sleeve (17, 23) form an additional bearing point (27, 29) of the bearing (5, 9), and wherein the main bearing point (26, 28) is formed with play and the additional bearing point (27, 29) without play.

8 Claims, 3 Drawing Sheets

Figure 1:
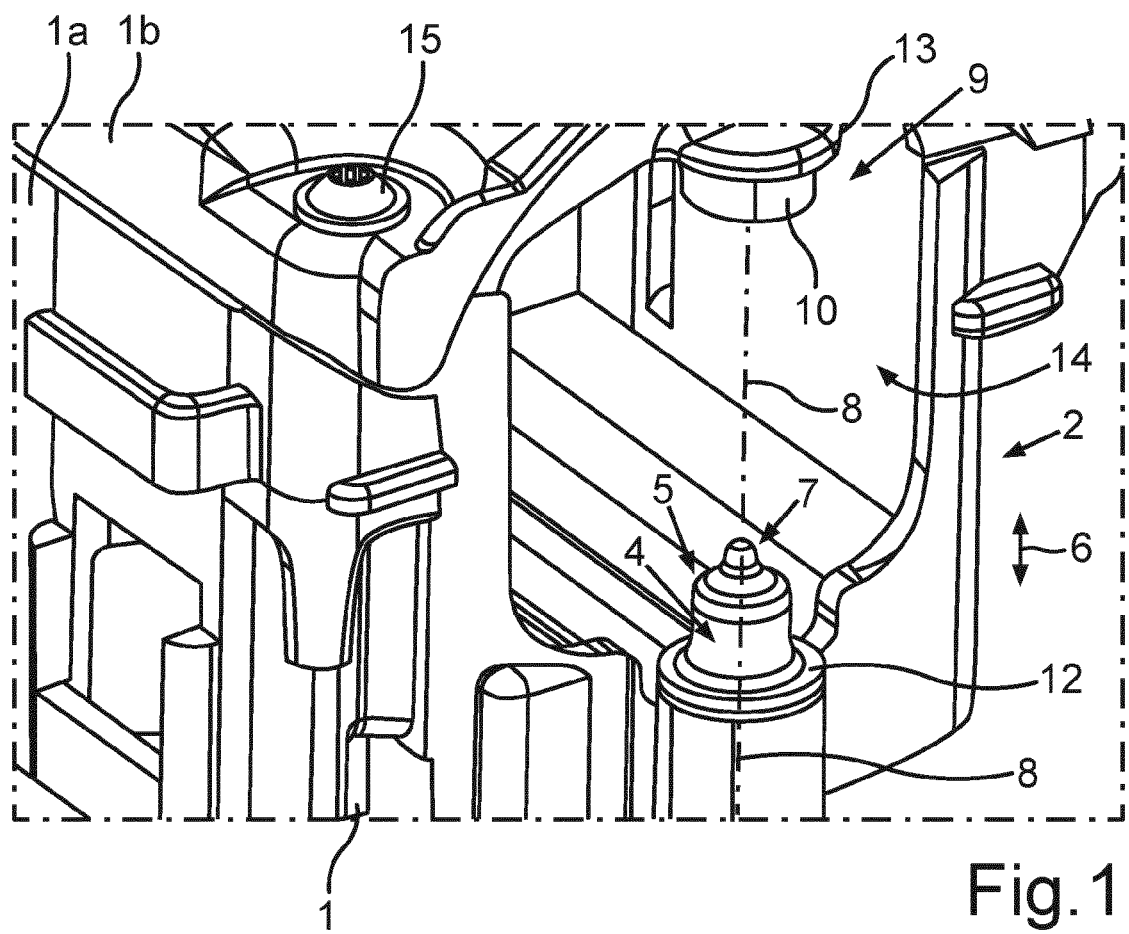

(51) Int. Cl.
  *B60Q 1/14* (2006.01)
  *F16C 17/26* (2006.01)
  *F16C 27/02* (2006.01)
  *F16C 11/04* (2006.01)

(56) References Cited

U.S. PATENT DOCUMENTS

2007/0125631 A1*  6/2007  Hasch et al. ............... 200/6 BA
2013/0001056 A1*  1/2013  Wakita et al. ............... 200/337

FOREIGN PATENT DOCUMENTS

| DE | 10 2004 033 447 A1 | | 7/2005 |
|----|--------------------|---|--------|
| DE | 10 2004 042 653 A1 | | 3/2006 |
| DE | 10 2006 001 695 A1 | | 7/2007 |
| DE | 10 2009 004 744 A1 | | 7/2010 |
| EP | 1612103 A1 | * | 1/2006 |
| KR | 10-2007-0016103 A | | 2/2007 |

OTHER PUBLICATIONS

Hirschfeld Klaus, Steering column switch for motor vehicle has operating lever held on two pivot pins with spherical end portions and inner projection with compression spring engaging bolt, Mar. 9, 2006, German Patent Office, DE 10 2004 042 653 A1, Machine Translation of Description.*
Steiling et al., Lageranordnung für eine Verstelleinrichtung in einem Kraftfahrzeug, Jul. 22, 2010, German Patent Office, DE 10 2009 004 744 A1, English Abstract.*
Steiling et al., Lageranordnung für eine Verstelleinrichtung in einem Kraftfahrzeug, Jul. 22, 2010, German Patent Office, DE 10 2009 004 744 A1, Machine Translation of Description.*
Lipfert et al., Receiving part with optimal axial play for a moving part of a switch, Jan. 4, 2006, EPO, EP 1 612 103 A1, English Abstract.*
Lipfert et al., Receiving part with optimal axial play for a moving part of a switch, Jan. 4, 2006, EPO, EP 1 612 103 A1, Machine Translation of Description.*
International Search Report for corresponding International Application No. PCT/EP2012/052832, mailed May 4, 2012 (6 pages).
Office Action for corresponding German Application No. 10 2011 014 252.5, mailed Dec. 9, 2011 (6 pages).

* cited by examiner

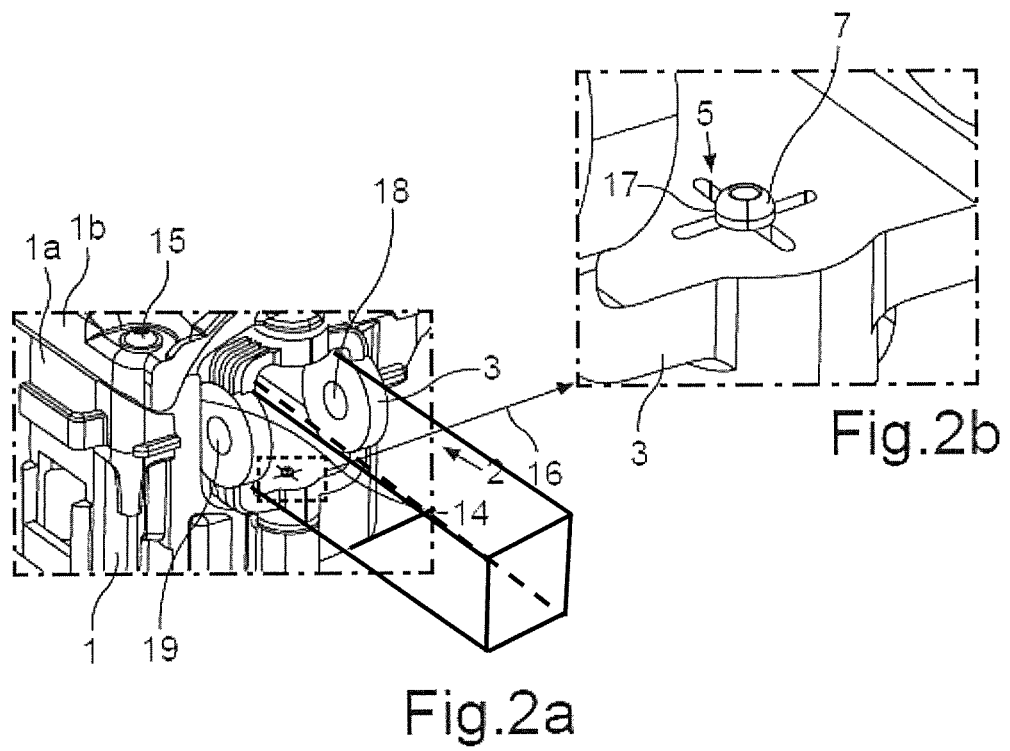
Fig.2a
Fig.2b
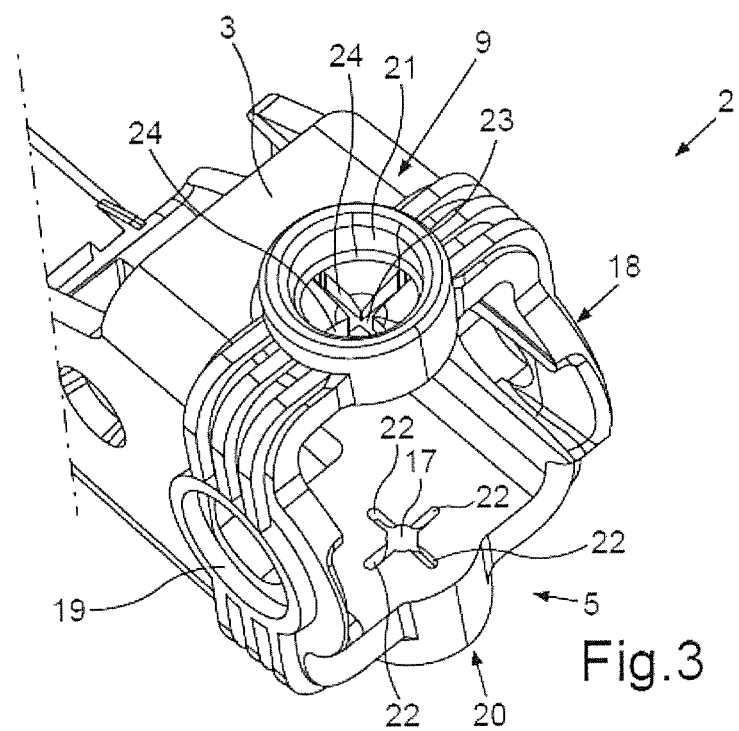
Fig.3

BEARING ASSEMBLY OF A STEERING COLUMN LEVER ON A STEERING COLUMN PART, AND MOTOR VEHICLE WITH SUCH A BEARING ASSEMBLY

The invention concerns a bearing assembly of a steering column lever on a steering column part of a motor vehicle, wherein the steering column lever is mounted on the steering column part pivotably at least indirectly via a bearing. The bearing has a main bearing point which is formed by a main bearing journal and a corresponding main bearing sleeve or main bearing shell. The invention also concerns a motor vehicle with such a bearing assembly.

Bearing assemblies for steering column levers or steering column switches of a motor vehicle are the state of the art. Normally universal joints are used which are also known as cardan joints. The use of a universal joint allows a pivot movement of the steering column lever in two pivot directions. An intermediate element is used for this: firstly this intermediate element is mounted on the steering column part pivotably in a first pivot direction, secondly the actual steering column lever is mounted on the intermediate element pivotably in a second direction perpendicular thereto.

In the development of a bearing assembly or in the dimensioning of a bearing, certain compromises must be made: the bearing must be dimensioned sufficiently large and robust to withstand the activation forces which act on the bearing point on activation of the steering column lever. Above all, the bearing assembly must be able to absorb "abusive forces" when the user activates the steering column lever "forcefully" or with great force. If the main bearing point—the main bearing journal with corresponding main bearing sleeve—is dimensioned sufficiently large, a degree of play must be present between the main bearing journal and the corresponding main bearing sleeve so that the steering column lever can be moved easily and without great effort. If there were no play between the main bearing journal and the main bearing sleeve, relatively high torques would have to be applied in order to activate the steering column switch.

Firstly the main bearing point must be dimensioned sufficiently large for it to withstand the relatively high activation forces and hence for the bearing not to be destroyed. Secondly the main bearing point must have a corresponding play so that the steering column lever can be activated with reasonable force. The steering column lever can therefore wobble due to tolerances.

The object of the invention is to find a way in which, in a bearing assembly of the type cited initially, firstly relatively high forces (e.g. abusive forces) on activation of a steering column lever can be withstood and hence the steering column lever can be constructed sufficiently robustly, and secondly a perceived high quality of the steering column lever can be ensured.

This aim is achieved by a bearing assembly with the features of claim 1, and a motor vehicle with the features of claim 9. Advantageous embodiments of the invention are the subject of the dependent claims, the description and the figures.

In a bearing assembly according to the invention of the steering column lever on a steering column part of a motor vehicle, the steering column lever is mounted on the steering column part pivotably at least indirectly via a bearing. The bearing contains a main bearing point which is formed by a main bearing journal and a corresponding main bearing sleeve. According to the invention, the bearing also has an additional bearing journal which is arranged coaxially or concentrically in relation to the main bearing journal, and in particular has a smaller diameter than the main bearing journal. The additional bearing journal and a corresponding additional bearing sleeve or shell form an additional bearing point of the bearing. It is provided that the main bearing point is formed with play and the additional bearing point without play (in the radial and/or axial direction). This means that the main bearing journal and main bearing sleeve have play in relation to each other, while the additional bearing sleeve and additional bearing journal are arranged play-free in relation to each other.

The effect according to the invention is also achieved in that as well as the main bearing point, an additional bearing point is provided which is formed by an additional bearing journal—in particular with smaller diameter—and a corresponding additional bearing sleeve. The main bearing point—with the main bearing journal and main bearing sleeve—can thus withstand high activation forces because of the relatively large diameter, so that the steering column switch is particularly robust and can withstand high abusive forces. On the other hand, the additional bearing point—with the additional bearing journal and additional bearing sleeve—is designed play-free and thus ensures the perceived high quality of the steering column switch. If the additional bearing point is formed with a smaller diameter, the advantage exists that high torques need not be applied to activate the steering column lever. The friction moments at the additional bearing point are here negligibly low because of the small diameter, and the user can activate the steering column lever without great effort. The bearing forces are absorbed by the additional bearing point only until the play in the main bearing point has been overcome and the latter assumes the supporting function. With the bearing assembly according to the invention, despite greater tolerances, always a 100% play-free bearing can be provided—cost-neutrally—which ensures the perceived high quality of the steering column switch.

Thus the additional bearing point is designed play-free, while the main bearing point has play. The advantages of the invention are fully utilised if the additional bearing journal or bearing pin has a smaller diameter than the main bearing journal. Firstly the perceived high quality of the steering column lever is thus ensured since there is no play in the additional bearing point; secondly the steering column lever can be activated particularly reliably and without great effort—i.e. with low torque—because the friction moments which occur here are particularly low because of the small diameter.

It has proved particularly advantageous if the additional bearing journal cooperates elastically with the additional bearing sleeve. Thus the additional bearing point can be an elastic bearing point in which an elastic deformation of at least one bearing partner is permitted. This embodiment has the advantage that the activation forces act on the additional (small) bearing point only until a corresponding torque is reached and the play in the main bearing point has been overcome. Then the main bearing point assumes its actual supporting function and all the activation force can be absorbed by the main bearing point. This prevents destruction of the bearing assembly, namely in particular the additional bearing point, including the additional bearing journal and additional bearing sleeve.

The elasticity of the additional bearing point can be achieved in various ways: firstly the additional bearing journal and/or the additional bearing sleeve can have an element made from an elastic material—for example rubber—which can deform elastically on interaction with the bearing partner. Secondly—in addition or alternatively—the additional bearing sleeve can be provided with at least one slot which is formed open towards a periphery of the bearing sleeve facing the additional bearing journal. The at least one slot can extend in the radial direction. The slot then ensures an elastic deformation of the additional bearing sleeve. For example two or three or four slots can be provided which each extend radially outward from the periphery of the bearing sleeve. In the embodiment with the at least one slot, the additional bearing sleeve can even be made completely of plastic; also the additional bearing journal can be made of plastic.

In one embodiment the additional bearing journal lies directly adjacent to the main bearing journal in the axial direction. For example the additional bearing journal can be formed as a continuation of the main bearing journal. The additional bearing point can thus lie directly next to the main bearing point. This has the advantage that the bearing as a whole can be constructed particularly compactly. Secondly this guarantees a reliable transmission of forces to the main bearing point, and the additional bearing point is protected from destruction.

In a particularly stable and robust bearing assembly, the main bearing journal and the additional bearing journal are formed integrally or joined together integrally.

Preferably the steering column lever is attached to the steering column part via a universal joint (cardan joint). The universal joint preferably has an intermediate element which is firstly mounted on the steering column part pivotably in a first pivot direction; secondly the actual steering column lever can be mounted at the intermediate element pivotably, in particular in a second pivot direction, perpendicular to the first. In particular it is the intermediate element of the universal joint which is mounted pivotably on the steering column part via said bearing, including the main bearing point and additional bearing point. In addition or alternatively however it can also be provided that the actual steering column lever is mounted pivotably at the intermediate element via such a bearing with a main bearing point and an additional bearing point.

As well as the abovementioned (first) bearing, the bearing assembly can also have a second bearing arranged coaxially or concentrically to the first bearing. The second bearing can also contain a main bearing point which is formed by a main bearing journal and a corresponding main bearing sleeve or main bearing shell. An additional bearing point of the second bearing—as in the first bearing—can be formed by an additional bearing journal which is arranged coaxial to the main bearing journal and has a smaller diameter, and by an additional bearing sleeve. For the mounting of the steering column lever on the steering column part, in this embodiment two separate coaxial bearings can be provided, which are located opposite each other and in particular are arranged mutually opposing, each having a said main bearing point and an additional bearing point. This makes the bearing assembly particularly stable.

The use of a second bearing with a corresponding additional bearing point also allows the provision of a bearing assembly which is formed play-free in both the radial and the axial directions. For example the first bearing can ensure an absence of play in the radial direction while the second bearing ensures an absence of play in the axial direction. The additional bearing journal of the first bearing can be supported radially play-free on the additional bearing sleeve of the same bearing, so that the additional bearing point of the first bearing and hence the entire bearing assembly is formed play-free in the radial direction. In contrast the additional bearing journal of the second bearing can be supported substantially axially on the additional bearing sleeve of the second bearing, so that the additional bearing point of the second bearing and hence also the entire bearing assembly are formed play-free in the axial direction. Thus a particularly high-quality bearing assembly can be created in which no play at all is present in either the radial or axial directions, and thus no wobble movement can be provoked.

The two bearings are preferably arranged relative to each other such that the additional bearing journals point towards or face each other. The respective main journals therefore point towards each other.

The invention also concerns a motor vehicle which has a bearing assembly according to the invention. The preferred embodiments and their advantages proposed in relation to the bearing assembly according to the invention apply accordingly to the motor vehicle according to the invention.

Further features of the invention arise from the claims, the figures and the figure description. All features and feature combinations cited above in the description and the features and feature combinations shown in the figure description below and/or in the figures alone can be used not only in the combination given but also in other combinations or alone.

The invention is now explained in more detail below with reference to individual, preferred exemplary embodiments and with reference to the enclosed drawings.

Figure 4:
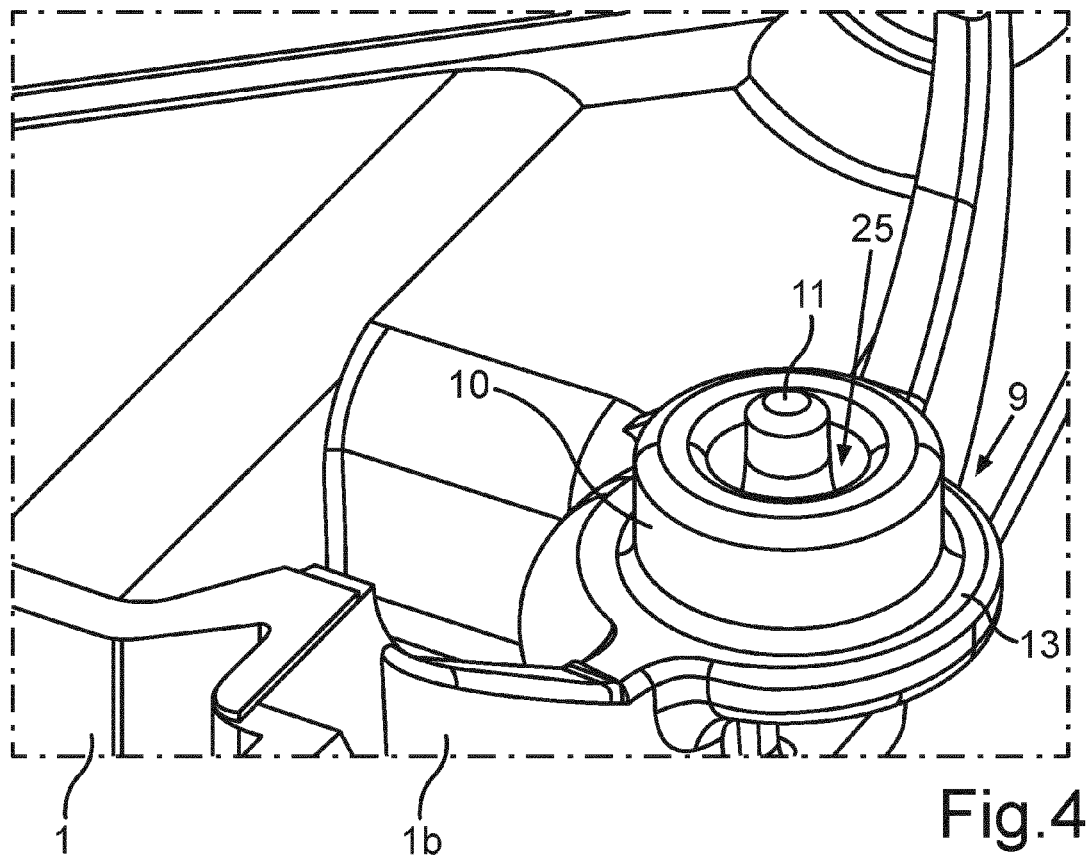
Figure 5:
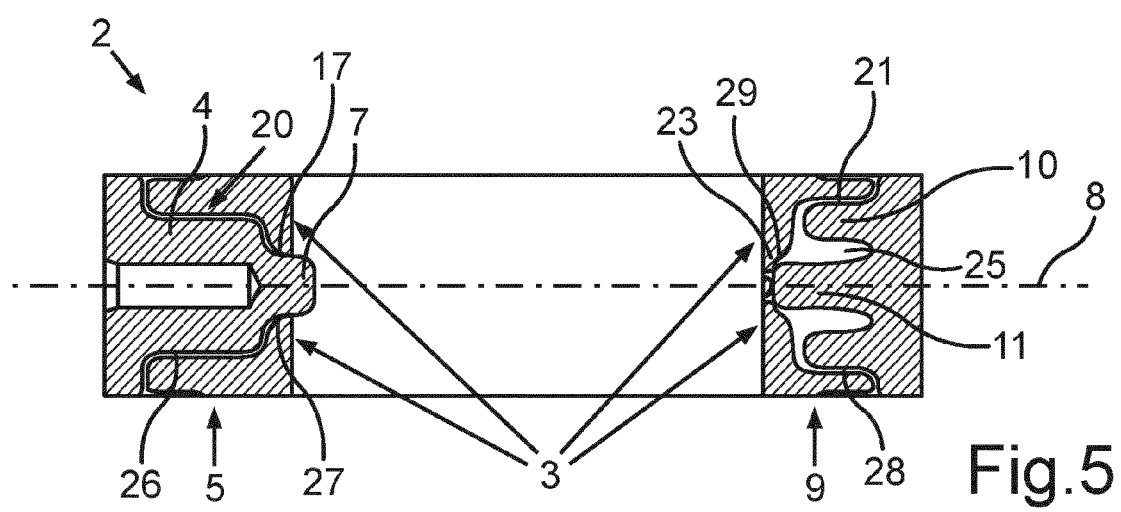

These show:

FIG. 1 diagrammatically and perspectively, a steering column part of a bearing assembly according to one embodiment of the invention;

FIGS. 2A and 2B diagrammatically and perspectively, the steering column part with an intermediate element of a universal joint mounted therein;

FIG. 3 diagrammatically and perspectively, the intermediate element of the universal joint;

FIG. 4 diagrammatically and perspectively, a main bearing journal and an additional bearing journal of a bearing; and FIG. 5 diagrammatically, a cross section through the bearing assembly with a first bearing and an opposing second bearing.

FIG. 1 shows diagrammatically a steering column part 1 in the form of a housing which is part of a bearing assembly 2 according to one embodiment of the invention. The steering column part 1 is part of a steering column of a motor vehicle, e.g. a car. The steering column part 1 is here produced in the form of a housing and adapted for mounting of an intermediate element 3, not shown in FIG. 1, of a universal joint (see FIG. 2).

A main bearing journal or main bearing pin 4 of a first bearing 5 is formed on the steering column part 1 and can be received in a corresponding main bearing sleeve or main bearing shell of the intermediate element 3. An additional bearing journal 7 of the first bearing 5 lies directly adjacent to the main bearing journal 4 in the axial direction (arrow 6). The additional bearing journal 7 is here formed as an axial extension of the main bearing journal 4. The cylindrical additional bearing journal 7 has a smaller diameter than the main bearing journal 4. Both the main bearing journal 4 and the coaxial additional bearing journal 7, protruding axially from the face of the main bearing journal 4, are cylindrical or cylinder-like bodies so that the first bearing 5 is a pivot bearing, or the intermediate element 3 of the universal joint can be mounted on the steering column part 1 pivotably about a pivot axis 8 via the bearing 5.

Opposite the first bearing 5 is a concentric second bearing 9 which also has a main bearing journal 10 pointing in the axial direction in the direction of the first bearing 5. The second bearing 9 also contains an additional bearing journal 11 of smaller diameter (FIG. 4) which is not shown in FIG. 1. The intermediate element 3 of the universal joint can thus be mounted on both sides on the steering column part 1 movably about the pivot axis 8 via the two bearings 5 and 9. With the intermediate element 3 in mounted state as shown in FIG. 2, the intermediate element 3 lies between a stop 12 of the first bearing 5 and a stop 13 of the second bearing 9. The intermediate element 3 can be held in a receiver 14 which is formed in the steering column part 1, namely between two housing halves 1a and 1b. These two housing halves 1a, 1b can be connected together for example by means of a screw connection, such as by means of a screw 15.

FIG. 2A shows the bearing assembly 2 with the intermediate element 3 of the universal joint in mounted state. The steering column part 1 is shown from the same aspect as in FIG. 1, wherein the intermediate element 3 is held in regions in the receiver 14 of the steering column part 1. As shown by the arrow 16, a region of the bearing assembly 2 is shown enlarged in FIG. 2B.

As already stated, the intermediate element 3 has corresponding bearing shells, namely a main bearing sleeve to receive the main bearing journal 4 of the first bearing 5, and a smaller additional bearing sleeve 17 to receive the additional bearing journal 7. With the intermediate element 3 in mounted state, the additional bearing journal 7 extends through the additional bearing sleeve 17 and protrudes out of this additional bearing sleeve 17 so that a small region or the free end of the additional bearing journal 7 protrudes above the surface of the intermediate element 3. This is clearly evident in FIG. 2B.

Furthermore with reference to FIG. 2A, the intermediate element 3 also has two bearing shells 18, 19 in which corresponding bearing pins of a steering column lever or steering column switch (not shown in the figures) can be held. A steering column lever can thus be mounted on the intermediate element 3 pivotably about a pivot axis running perpendicular to pivot axis 8 (FIG. 1).

The intermediate element 3 of the universal joint is shown in detail in FIG. 3. It has a main bearing sleeve 20 which is part of the first bearing 5, and a further main bearing sleeve 21 which belongs to the second bearing 9. The corresponding main bearing journals 4 and 10 can be held in the main bearing sleeves 20, 21, as shown in FIG. 1. The concentric additional bearing sleeve 17 is directly adjacent in the axial direction to the main bearing sleeve 20 and is adapted to receive the additional bearing journal 7. Also in this embodiment example, four slots 22 are formed in the intermediate element 3 and extend radially outward from the additional bearing sleeve 17 and as a whole take the form of a cross. The slots 22 are formed open towards the additional bearing sleeve 17.

Correspondingly, adjacent to the main bearing sleeve 21 of the second bearing 9 is an additional bearing sleeve 23 which is arranged concentric thereto and also surrounded by four slots 24. The corresponding additional bearing journal 11 (FIG. 4) can be held in the additional bearing sleeve 23 of the second bearing 9.

FIG. 4 shows the main bearing journal 10 and additional bearing journal 11 of the second bearing 9. As evident from FIG. 4, the additional bearing journal 11 has a significantly smaller diameter than the main bearing journal 10. In contrast to the first bearing 5, the main bearing journal 10 of the second bearing 9 has an axial receiver 25 in which the additional bearing journal 11 is arranged. The additional bearing journal 11 extends through the axial receiver 25 and protrudes out of the main bearing journal 10, namely in the axial direction or in the direction of the pivot axis 8 (FIG. 1). The additional bearing journal 11 extends slightly further in the axial direction than the main bearing journal 10.

FIG. 5 shows a section view through the bearing assembly 2 along pivot axis 8 in FIG. 1. Here we see the first bearing 5 and also the second bearing 9. The first bearing 5 contains a first bearing point 26 and a second bearing point 27. The first bearing point 26 is formed firstly by the main bearing journal 4 and secondly by the main bearing sleeve 20 of the intermediate element 3. Correspondingly, the additional bearing point 27 is formed by the additional bearing journal 7 and by the additional bearing sleeve 17 in the intermediate element 3. As evident from FIG. 5, the additional bearing journal 7 extends through the additional bearing sleeve 17 and protrudes out of this, namely outwardly in the axial direction. Whereas the main bearing point 26 has play, the additional bearing point 27 is designed play-free. The additional bearing journal 7 is supported radially on the additional bearing sleeve 27 so that the first bearing 5 ensures a bearing assembly 2 which is play-free in the radial direction.

In contrast, the second bearing 9—as already stated—has a main bearing journal 10 and the additional bearing journal 11 which protrudes in the axial direction from the axial receiver 25 in the main bearing journal 10. The second bearing 9 also contains a main bearing point 28 and an additional bearing point 29. The main bearing point 28 is formed firstly by the main bearing journal 10 and secondly by the main bearing sleeve 21. This main bearing point 28 here has play, like the main bearing point 26 of the first bearing 5. The additional bearing point 29 of the second bearing 9 is formed by the additional bearing journal 11 and the additional bearing sleeve 23 in the intermediate element 3. In contrast to the first bearing 5, here the additional bearing journal 11 is supported on the additional bearing sleeve 23 not radially or not only radially, but axially. This additional bearing point is also formed play-free so that the second bearing 9 ensures an absence of play in the axial direction.

Both the additional bearing point 27 of the first bearing and the additional bearing point 29 of the second bearing 9 are formed as elastic bearing points. Thus an elastic deformation of at least one of the bearing partners is permitted, i.e. the additional bearing journal 7, 11 and/or the additional bearing sleeve 17, 23. In principle it can be provided here that the additional bearing journal 7, 11 and/or the additional bearing sleeve 17, 23 are made at least in regions from an elastic material, such as rubber. Alternatively the additional bearing journals 7, 11 and/or the additional bearing sleeves 17, 23 can be made completely of plastic or another firm material; in this case, the elasticity of the additional bearing points 27, 29 is guaranteed by the cross-shaped slots 22 or 24.

In total, a bearing assembly 2 of a steering column lever on a steering column part 1 is provided which is firstly of particularly high quality and secondly also robust. The main bearing points 26, 28 can withstand high activation forces; secondly the smaller additional bearing points 27, 29 ensure a play-free mounting arrangement 2 and hence a perceived high quality of the steering column switch.

The invention claimed is:

1. A bearing assembly of a steering column lever on a steering column part of a motor vehicle, the bearing assembly comprising:
    a first bearing having a first main bearing point which is formed by a first main bearing journal and a corresponding first main bearing sleeve, wherein the steering column lever is mounted on the steering column part pivotably via the first bearing,
    wherein the first bearing has an additional first bearing point which is arranged concentrically in relation to the first main bearing point and is formed by an additional first bearing journal and a corresponding additional first bearing sleeve, wherein the first main bearing point is formed with play and the additional first bearing point is formed without play, and a second bearing which is arranged concentrically to the first bearing and has a second main bearing point which is formed by a second main bearing journal and a corresponding second main bearing sleeve, and an additional second bearing point which is formed by an additional second bearing journal, arranged coaxially in relation to the second main bearing journal and with a smaller diameter than the second main bearing journal, and by a corresponding additional second bearing sleeve.

2. The bearing assembly according to claim 1, wherein the first additional bearing journal has a smaller diameter than the first main bearing journal.

3. The bearing assembly according to claim 1, wherein the additional first bearing journal cooperates elastically with the additional first bearing sleeve.

4. The bearing assembly according to claim 1, wherein the additional first bearing journal lies directly adjacent to the first main bearing journal in the axial direction.

5. The bearing assembly according to claim 1, wherein the first main bearing journal and the additional first bearing journal are formed integrally.

6. The bearing assembly according to claim 1, wherein the steering column lever is mounted pivotably on the steering column part via a universal joint, wherein an intermediate element of the universal joint is mounted on the steering column part via the first bearing.

7. The bearing assembly according to claim 1, wherein:
the additional first bearing journal of the first bearing is supported radially on the additional first bearing sleeve of the first bearing and thus the additional first bearing point of the first bearing is formed play-free in the radial direction, and the additional second bearing journal of the second bearing is supported axially on the additional second bearing sleeve of the second bearing and thus the additional second bearing point of the second bearing is formed play-free in the axial direction.

8. A motor vehicle with a bearing assembly according to claim 1.

* * * * *